Patented Aug. 20, 1929.

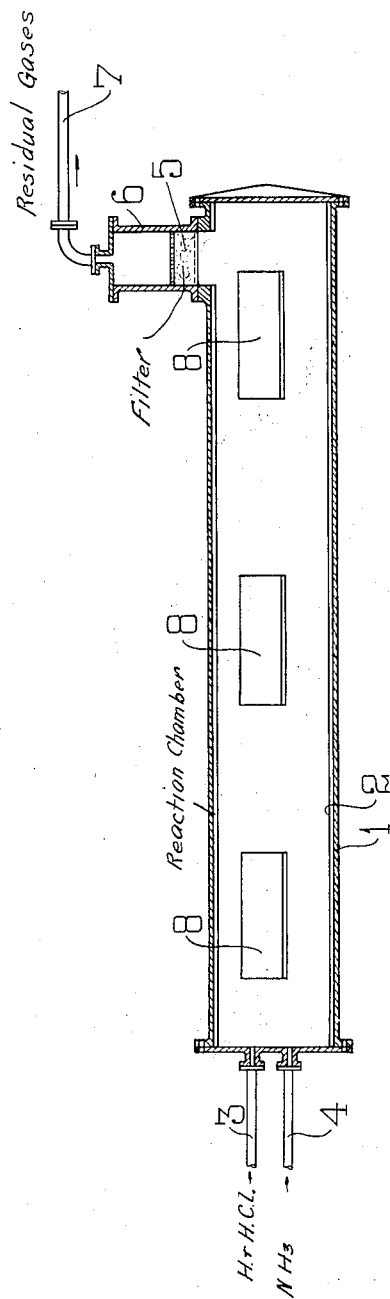

1,725,292

UNITED STATES PATENT OFFICE.

JOSEPH WILLIAM MOORE, OF RUNCORN, AND WILFRID GUSTAV POLACK, OF FRODSHAM, ENGLAND, ASSIGNORS TO IMPERIAL CHEMICAL INDUSTRIES LIMITED, OF LONDON, ENGLAND, A BRITISH COMPANY.

MANUFACTURE OF AMMONIUM CHLORIDE CRYSTALS.

Application filed June 1, 1927, Serial No. 195,746, and in Great Britain June 25, 1926.

This invention relates to improvements in the manufacture of ammonium chloride crystals.

It is the primary object of the invention to provide a simpler and cheaper method for the manufacture of the tough fibrous crystals, similar to those usually produced by sublimation of solid ammonium chloride using heat from an external source.

These are valuable for certain purposes, and ordinarily command a higher price than fine powder.

They are usually obtained by using heat from an external source, and a separate and distinct process involving expensive and troublesome methods of sublimation and condensation.

According to the present invention we effect the interaction of gaseous ammonia and gaseous hydrochloric acid under such thermal conditions (particularly with regard to velocity or thermal insulation) that very considerable reaction temperature is developed when it is found that combination occurs with the simultaneous formation of the more valuable crystalline form of ammonium chloride.

The ammonia, whether liquid or gaseous, may be substantially anhydrous and may if desired be used in the liquid form to prevent excessive generation of heat. Alternatively the gases may contain moisture provided the quantity of moisture is not so great as to cause deposition of water on the solid salt.

Preferably we employ gaseous synthetic ammonia and synthetic hydrochloric acid gas containing a controlled proportion of hydrogen. When these are passed into one end of a reaction chamber so that the hydrochloric acid preferably enters from the top and ammonia from the bottom, it is found that at a slow rate of flow ammonium chloride is precipitated in the form of snow-like crystals.

A similar result is obtained when these gases are caused to react on a laboratory scale. We do not claim such a process in this application.

We find however—and this is the essential feature of the invention—that if the gases are allowed to react at a higher rate of output in such a manner as to develop and conserve the heat of the reaction to a substantial extent, ammonium chloride is formed as cellular structure which, when removed from the reaction chamber, appears as a mass of extremely pure tough fibrous crystals, similar to those ordinarily produced by a separate and distinct sublimation process, using heat from an external source.

Example.

Gaseous synthetic ammonia and an equivalent quantity of gaseous synthetic hydrochloric acid (containing 30% free hydrogen) at atmospheric temperature are passed through a suitably constructed cast iron cylinder 1 lined with glazed earthenware tiles 2, and having an internal diameter of 21 inches and a length of 13 feet. The gases are introduced through inlet pipes 3 and 4 and the residual gases pass through the filter 5, the pipe 6 and the outlet pipe 7. The cylinder is provided with doors 8 for removal of solids. The gases are introduced at a rate sufficient to produce 6 pounds of ammonium chloride per hour. A reaction temperature of about 300° C. is thus attained and the resulting solid is deposited at this high temperature so that the product is in part, or all, a mass of tough fibrous crystals similar to these usually obtained by sublimation and condensation, using heat from an external source.

The temperature limits appear to lie between 230° and 310° C. Below 230°, the snow-like or fine crystals are obtained; above 310°, it is difficult to secure adequate deposition.

The product is chemically pure or practically so.

Obviously the conditions will vary with different sizes of apparatus.

In the above example, concentrated gases are employed and this naturally assists in maintaining a high temperature in the reaction vessel.

We declare that what we claim is:—

1. The process of manufacturing crystals of ammonium chloride which consists in allowing gaseous synthetic ammonia to react with gaseous synthetic hydrochloric acid at a temperature of about 300° C. so that a mass of tough fibrous crystals similar to those usually produced by a sublimation using heat from an external source is obtained.

2. The process of manufacturing crystals of ammonium chloride which consists in allowing gaseous ammonia to react with gaseous hydrochloric acid at temperatures between about 230° and 310° C. so that a mass of tough fibrous crystals similar to those usually produced by a sublimation using heat from an external source is obtained.

3. The process of manufacturing crystals of ammonium chloride which consists in allowing gaseous ammonia to react was gaseous hydrochloric acid at a temperature of about 300° C. so that a mass of tough fibrous crystals similar to those usually produced by a sublimation using heat from an external source is obtained.

In witness whereof, we have hereunto signed our names this 19th day of May, 1927.

JOSEPH WILLIAM MOORE.
WILFRID GUSTAV POLACK.